US011117174B2

(12) United States Patent
Stein

(10) Patent No.: US 11,117,174 B2
(45) Date of Patent: Sep. 14, 2021

(54) POSITIONABLE ROBOTIC CELL, PRODUCTION FACILITY WITH A MANUFACTURING DEVICE AND WITH POSITIONABLE ROBOTIC CELL AS WELL AS METHOD FOR OPERATING SUCH A POSITIONABLE ROBOTIC CELL

(71) Applicant: BYSTRONIC LASER AG, Niederoenz (CH)

(72) Inventor: Christian Stein, Seengen (CH)

(73) Assignee: BYSTRONIC LASER AG, Niederoenz (CH)

( * ) Notice: Subject to any disclaimer, the term of this patent is extended or adjusted under 35 U.S.C. 154(b) by 211 days.

(21) Appl. No.: 16/343,710

(22) PCT Filed: Oct. 18, 2017

(86) PCT No.: PCT/EP2017/076626
§ 371 (c)(1),
(2) Date: Apr. 19, 2019

(87) PCT Pub. No.: WO2018/073312
PCT Pub. Date: Apr. 26, 2018

(65) Prior Publication Data
US 2019/0270128 A1    Sep. 5, 2019

(30) Foreign Application Priority Data
Oct. 21, 2016   (EP) .................................. 16195186

(51) Int. Cl.
*B21D 5/02*    (2006.01)
*B21D 5/00*    (2006.01)
(Continued)

(52) U.S. Cl.
CPC .......... *B21D 5/0281* (2013.01); *B21D 5/002* (2013.01); *B21D 43/105* (2013.01); *B25J 5/00* (2013.01); *B25J 5/007* (2013.01); *B25J 19/02* (2013.01)

(58) Field of Classification Search
CPC .... B21D 43/105; B21D 5/002; B21D 5/0281; B25J 19/02; B25J 5/00; B25J 5/007
See application file for complete search history.

(56) References Cited

U.S. PATENT DOCUMENTS 5,666,202 A *  9/1997  Kyrazis ................. B25J 9/1697
                                            250/559.29
2002/0092333 A1 *  7/2002  Lindstrom ............ B21D 5/002
                                                    72/19.4
(Continued)

FOREIGN PATENT DOCUMENTS

DE     102011107617     2/2012
EP        0636435        2/1995
(Continued)

OTHER PUBLICATIONS

International Search Report cited in PCT/EP2017/076626, dated Nov. 14, 2017.

*Primary Examiner* — Behrang Badii
*Assistant Examiner* — Daniel L Greene
(74) *Attorney, Agent, or Firm* — Workman Nydegger

(57) ABSTRACT

The invention relates to a positionable robotic cell for placement at a bending machine. The robotic cell comprises a frame for receiving the robot and a receiving device for a workpiece as well as a positioning device for repositioning the robotic cell. Moreover, a first sensor device is provided for recognizing the position of the robotic cell relative to the manufacturing device. The invention furthermore relates to a production facility with a bending machine and with such (Continued)

Figure 1:
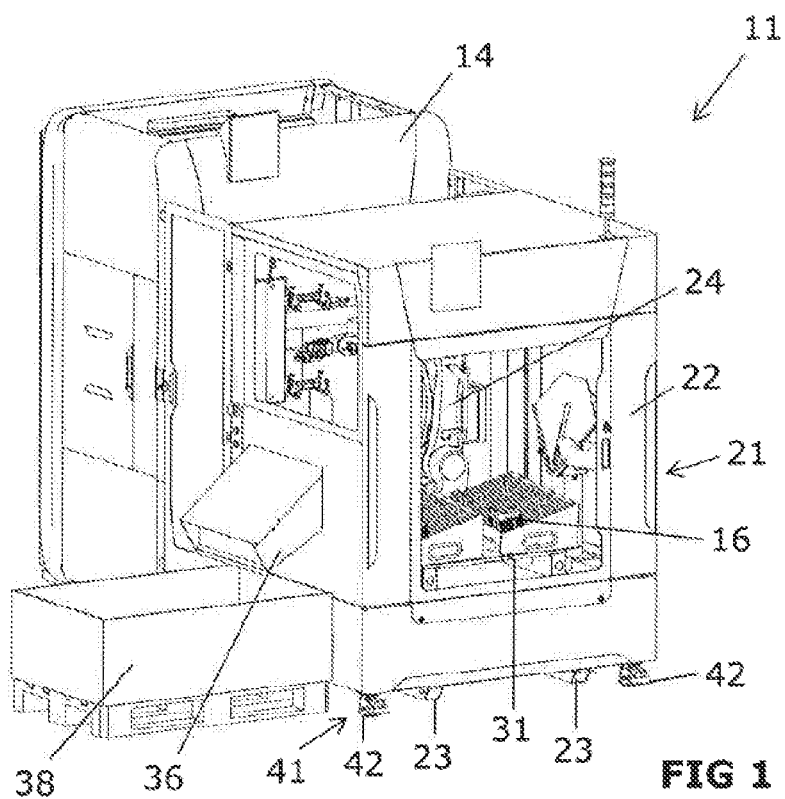

a robotic cell as well as a method for operating such a robotic cell at a bending machine.

18 Claims, 4 Drawing Sheets

(51) Int. Cl.
*B21D 43/10* (2006.01)
*B25J 5/00* (2006.01)
*B25J 19/02* (2006.01)

(56) References Cited

U.S. PATENT DOCUMENTS

| | | | |
|---|---|---|---|
| 2004/0154402 A1* | 8/2004 | Drake, Jr. | G01S 15/8906 73/621 |
| 2009/0224750 A1* | 9/2009 | Hosek | G01B 7/003 324/207.13 |
| 2015/0081092 A1* | 3/2015 | Jacobsen | B25J 9/065 700/245 |
| 2015/0108687 A1* | 4/2015 | Snyder | B29C 64/321 264/308 |
| 2015/0276549 A1* | 10/2015 | Lazic | B23F 23/02 33/501.19 |
| 2015/0375453 A1* | 12/2015 | Yost | C12N 11/04 435/174 |

FOREIGN PATENT DOCUMENTS

| | | |
|---|---|---|
| EP | 0462286 | 3/1995 |
| WO | 2016/094917 | 6/2016 |

* cited by examiner

POSITIONABLE ROBOTIC CELL, PRODUCTION FACILITY WITH A MANUFACTURING DEVICE AND WITH POSITIONABLE ROBOTIC CELL AS WELL AS METHOD FOR OPERATING SUCH A POSITIONABLE ROBOTIC CELL

The invention relates to a positionable robotic cell for the placement at a manufacturing device according to the preamble of claim 1, especially a positionable robotic cell with a robot and with a frame for receiving the robot for placement at a manufacturing device according to the preamble of claim 1, as well as a production facility with a manufacturing device and with such a positionable robotic cell as claimed in claim 12. Further, the invention relates to a method for operating such a positionable robotic cell at a manufacturing device according to claim 13.

A manufacturing device, especially a sheet metal machining device, is often used to produce individual parts, sometimes in series. These individual parts are often recurring parts or also series parts.

For example, a bending machine or a press brake is used to bend workpieces. Especially during a series manufacturing process, the attendance of the machine is not only expensive, but also very fatiguing for the attendant.

Other sheet metal machining devices are for example laser cutting machines or fluid jet cutting machines. By the term "manufacturing device" shall be understood in this context basically any machine which is suitable for the fabrication of workpieces which are fed to it.

It is known that parts of workpieces can be fabricated automatically with robots arranged at manufacturing devices and the costs for the production in a series manufacturing process are thereby lower than in the case of a manual feeding of the workpieces to the manufacturing device.

The drawback to the generally known solutions is that the work zone of the robot must be blocked off to prevent unintentional intrusion. Furthermore, a robot is permanently associated with a manufacturing device, which means additional labor expense for example if a production hall is reorganized, and this also hinders or even prevents a manual attendance of the manufacturing device.

From DE102011107617A1 there is known a positionable robotic cell for placement at a manufacturing device. The robotic cell comprises a frame for receiving a robot and at least one receiving device for at least one workpiece. With a robot arranged in the robotic cell as a handling device, workpieces are fed to and from the manufacturing device after the placement of the robotic cell there.

The drawback is that, after the positioning of the robotic cell at the manufacturing device, the robotic cell or the robot must be oriented in a definite relation to the manufacturing device.

From EP0636435B1 there is known a positionable robotic cell for placement at a manufacturing device. The manufacturing device is a sheet metal machining device and in particular a bending machine or a press brake. This robotic cell also comprises a frame for receiving a robot and at least one receiving device for at least one workpiece. Wheels are provided on the frame as the positioning device for the repositioning of the robotic cell.

Multiple centering blocks are arranged on the floor in front of the manufacturing device. Multiple centering heads are provided on the frame of the robotic cell, which can be plugged into the centering blocks or pulled out from them. In this way, the robotic cell is oriented in a definite position relative to the manufacturing device.

The drawback to this known solution is that centering blocks must be provided on the floor and therefore only one defined positioning grid is present for the robotic cell.

EP0462286 B1 discloses a sensor device which determines the distance between robot clamping jaws and tools of a processing machine.

The problem which the present invention proposes to solve is thus to create a positionable robotic cell for placement at a manufacturing device, especially at a sheet metal machining device, such as a bending machine or a press brake, which does not have the aforesaid drawbacks and which is in particular flexibly positionable. Further, the problem which the present invention proposes to solve is to create a production facility with a manufacturing device, especially with a sheet metal machining device, such as a bending machine or a press brake, and with such a positionable robotic cell as well as to provide a method for operating such a positionable robotic cell.

The problems are solved by the features of the independent claims. Advantageous modifications are presented in the figures and in the dependent patent claims.

According to the invention, at least a first sensor device is provided for detecting the position of the robotic cell relative to the manufacturing device. The robotic cell preferably comprises at least one robot and a frame to receive the robot.

This at least one first sensor device is part of a position detecting device or it constitutes such a device. After the positioning of the positionable robotic cell at the manufacturing device, the at least one first sensor device is used to determine the position of the positionable robotic cell relative to it. The at least one first sensor device is advantageously controlled via a control unit. Further, the at least one first sensor device is arranged on at least one movable element, such as an element of a robot arranged in the positionable robotic cell. By means of this at least one movable element, the at least one first sensor device can be moved appropriately in space and perform the desired activities.

In this context, the term "positioning device" is taken to mean for example wheels, rollers, rails, but also auxiliary means, such as guides, hooks, eyelets, or the like, for an external or autonomous repositioning device, such as a pallet truck, a forklift truck, a crane or the like.

Preferably, at least the first sensor device is self-detecting, whereby it performs by itself the detecting of the position of the robotic cell relative to the production facility.

Advantageously, at least the first sensor device is automatically self-detecting, so after the positioning of the robotic cell the detection of the position of the robotic cell relative to the production facility occurs automatically and advantageously entirely without the involvement of the attendant.

Preferably, at least the first sensor device comprises at least one first sensor for detecting and/or for measuring the position, making possible an easy detection of the position of the robotic cell relative to the production facility.

The at least one first sensor is for example an optical, advantageously a laser sensor, whereby the detection of the position of the robotic cell relative to the production facility can be easily done through optical detection and/or measurement.

In an alternative embodiment, the at least one first sensor is a sonic sensor, advantageously an ultrasonic sensor, by which the detection of the position of the robotic cell relative to the production facility can be done easily through sonic detection or through ultrasonic detection.

In a further alternative embodiment, the at least one first sensor is a mechanical sensor, by which the detection of the position of the robotic cell relative to the production facility can be done easily through mechanical detection, such as a sensing.

In a further alternative embodiment, the at least one first sensor is a magnetic sensor, by which the detection of the position of the robotic cell relative to the production facility can be done easily through magnetic detection. The magnetic sensor is for example a permanent magnet or an electromagnetic sensor.

At least the first sensor device may also comprise at least one first sensor, making possible various kinds of measurements and/or detections. This creates in particular a very flexible positionable robotic cell, where the detection of the position of the robotic cell relative to the production facility is done with the kind of measurement and/or detection which is most advantageous in the present situation.

Advantageously, the at least one first sensor is associated with an evaluation unit, which evaluates the position of the robotic cell with the aid of measurement data provided by the sensor, especially with the aid of a mathematical model, and determines a position relative to the manufacturing device. This makes possible an especially exact positioning of the robotic cell relative to the manufacturing device.

In connection with the foregoing remarks, by measurement of a position is meant the associating of at least two position parameters, and by detection is meant the recognition of at least one position parameter.

Preferably at least the first sensor device comprises at least one additional sensor, where the at least one additional sensor is an optical, preferably a laser sensor, and/or a sonic sensor, preferably an ultrasonic sensor, and/or a mechanical and/or a magnetic sensor. In this way, a very flexible positionable robotic cell is likewise created, wherein the detection of the position of the robotic cell relative to the production facility is done with the kind of measurement which is most advantageous in the present situation.

Preferably, a repositioning device is provided for the repositioning of the robotic cell, which simplifies the repositioning thereof, in addition to the positioning device. The repositioning device comprises for example guideways, hooks, eyelets or the like, for an advantageously external or autonomous repositioning device, such as a pallet truck, a forklift truck, a crane or the like.

Advantageously, the repositioning device interacts with the at least one first sensor device or it detects the repositioning of the robotic cell.

Preferably, the at least one receiving device comprises at least one guide element which can be arranged interchangeably on a bearing surface of the receiving device and the position of the at least one guide element can be detected by a sensor device. This receiving device can be adapted flexibly to workpieces and/or finished workpieces, such as bending parts. The detecting of the position of the at least one guide element by means of a sensor device ensures that a handling device, such as a robot, can move the workpiece securely.

Advantageously, the position of the at least one guide element is detected by at least the first sensor device, so that no additional sensor devices are needed and thus the costs for the fabrication of the positionable robotic cell can be kept low.

Preferably, the robotic cell comprises at least one communications connecting device for connecting the robotic cell to the manufacturing device, so that a communication between them is made possible. Advantageously, the communication between the robotic cell and the manufacturing device is by radio and/or WLAN and/or GPS and/or by Bluetooth®. In addition or alternatively, at least one cable connection can also be provided between the robotic cell and the manufacturing device.

Preferably, at least one additional sensor device is provided for detecting of multiple simultaneously grasped workpieces, which assures a reliable, advantageously automatic series production. The at least one additional sensor device recognizes when the handling device has accidentally grabbed more than one workpiece. In such a case, no machining of the workpiece is initiated, in order to prevent a wrong machining.

Preferably at least one workpiece singulation unit is provided, by means of which workpieces sticking together or lying against each other and having been grasped by the handling device can be separated from each other. This at least one workpiece singulation unit comprises at least one first holding device for a workpiece as well as at least one further holding device for a further workpiece, with which workpieces sticking together or lying against each other can be easily separated from each other.

Advantageously, the at least one first holding device and the at least one second holding device are facing each other, so that workpieces sticking together or lying against each other can be especially easily separated from each other.

The at least one first holding device and/or the at least one second holding device are pneumatic or magnetic in design, for example.

Preferably, one grasping device is provided to grab a workpiece or a finished workpiece, which ensures an easy handling in the production of machined workpieces. For example, a workpiece is machined by the manufacturing device, grabbed by means of the grasping device, and can be fed in a different orientation of the manufacturing device for further machining. The grasping device is advantageously at least one part of a grasping station, which is again advantageously arranged in or at the robotic cell.

Advantageously, the grasping device interacts with a further or at least one of the aforementioned sensor devices, so that the kind of workpiece, their position relative to the manufacturing device, and/or a multiple grasping of several workpieces at the same time is detected, for example, thereby making possible an advantageous series production.

Preferably at least one handling device is provided for the handling of workpieces, so that a compact and diversified positionable robotic cell is created.

Advantageously, the at least one handling device comprises at least one robot, which again advantageously is a multiaxial robot.

Advantageously, at least one sensor device is provided on the at least one handling device, by which data can be easily acquired. Especially advantageously, the first sensor device is provided on the at least one handling device, such that the position of the robotic cell relative to the manufacturing device is easily detectable.

The at least one sensor device is advantageously provided detachably on the at least one handling device, so that after acquiring the requisite data it can be removed from the at least one handling device and does not hinder subsequent movements of the handling device or the manufacturing.

Preferably, the production facility according to the invention comprises a manufacturing device, especially a sheet metal machining device, such as a bending machine or a press brake, and a positionable robotic cell, having at least one of the aforementioned features. The robotic cell can be controlled by a computer program. For this, the computer program detects the position of the robotic cell via the first sensor arrangement relative to the manufacturing device.

The computer program serves for the automatic positioning of the robotic cell. Preferably rules for the positioning can be taken into account, which have been created in a preparation phase for a manufacturing device, a selection of (particular) manufacturing devices, or for all manufacturing devices. Hence, the control process can be carried out consistently and in dedicated manner for the particular manufacturing device or for a group of manufacturing devices.

In the method according to the invention for the operation of a positionable robotic cell, having at least one of the aforementioned features, for a manufacturing device or at a manufacturing device, especially at a sheet metal machining device, such as a bending machine or a press brake, the robotic cell is positioned at the manufacturing device. Then the position of the robotic cell relative to the manufacturing device is detected by means of at least the first sensor device. The method is preferably carried out automatically by a computer program.

The problem is hence furthermore solved by a computer program with computer program sections which are stored on a machine-readable data storage medium for the performance of all method steps as described above when the computer program runs on a computer unit (computer, computer network, processor of a robotic cell etc.).

In this way, the exact position of the robotic cell is known relative to the manufacturing device and it can be taken into account for the manufacturing of workpieces.

With the data acquired, for example a basis is determined, and the movements of the handling device, e.g., the robot, will occur relative to this basis. The movements of the handling device are advantageously always the same and only the basis will change. The pedestal of the handling device is advantageously the zero position of a coordinate system. Hence, the position, the angle and/or the direction in regard to the zero position is determined, being advantageously related to the (global) coordinate system of the handling device, especially a robot.

With the at least one sensor, which is arranged for example detachably on the handling device, e.g., on the robot arm, lines are traversed and the corresponding distances to them are measured. If this procedure is performed for two lines, a rotation of the robotic cell relative to the manufacturing device can also be easily determined in this way.

Alternatively, at least two points are selected and detected in order to determine the corresponding distances.

On the basis of the parameters acquired, e.g., the distance parameters, a graph is plotted, for example.

Preferably, after detecting a first position of the robotic cell the robotic cell is repositioned in at least one further position. If it is recognized during the first measurement that not all of the required manufacturing steps, or none of those steps can be performed, the robotic cell is repositioned, advantageously by a repositioning device, into a position in which the required manufacturing steps can be performed. Before production states, a repeat measurement is taken to detect the position of the robotic cell relative to the manufacturing device.

Preferably, the robotic cell is in communication with the manufacturing device, so that these can communicate with each other.

Advantageously, the robotic cell is in communication with a control device of the manufacturing device. More advantageously, the operation of the robotic cell occurs by an operator unit of the manufacturing device.

Especially advantageously, however, the manufacturing device is controlled by the robotic cell, which prevents an unintentional machining of a workpiece by means of the manufacturing device.

Further benefits, features and details of the invention will emerge from the following description, in which exemplary embodiments of the invention are described with reference to the drawings.

Figure 2:
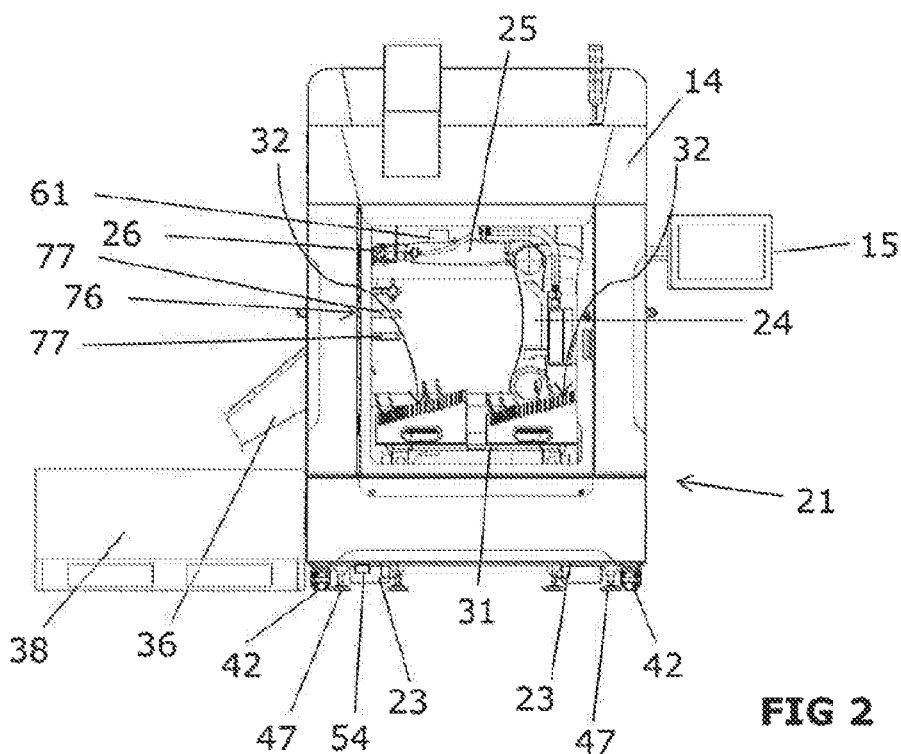
Figure 3:
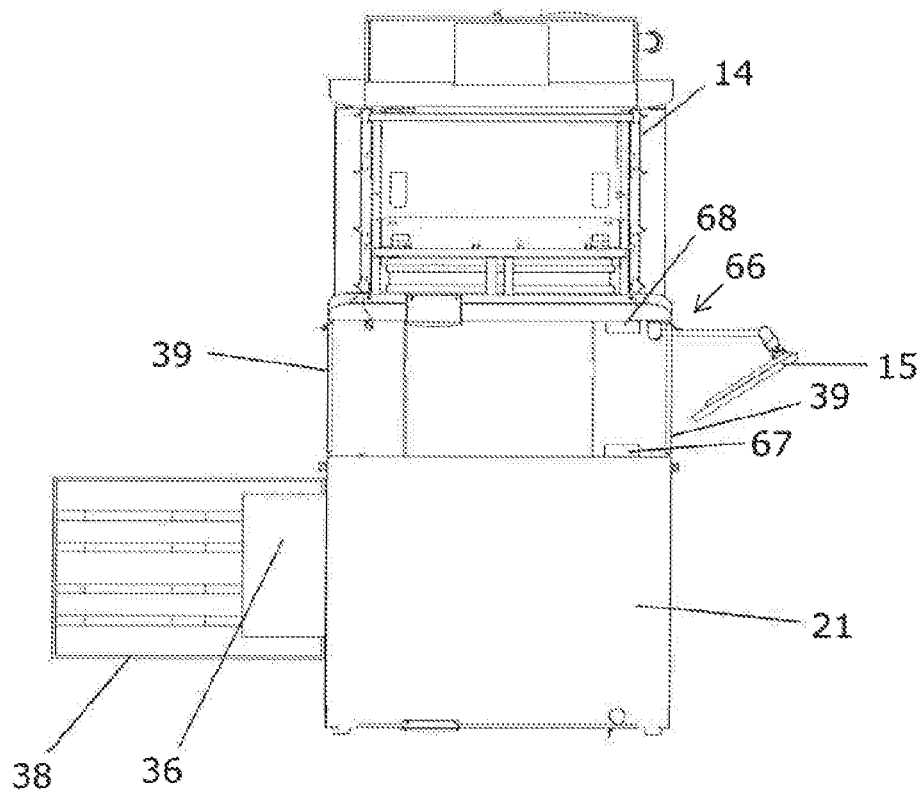
Figure 4:
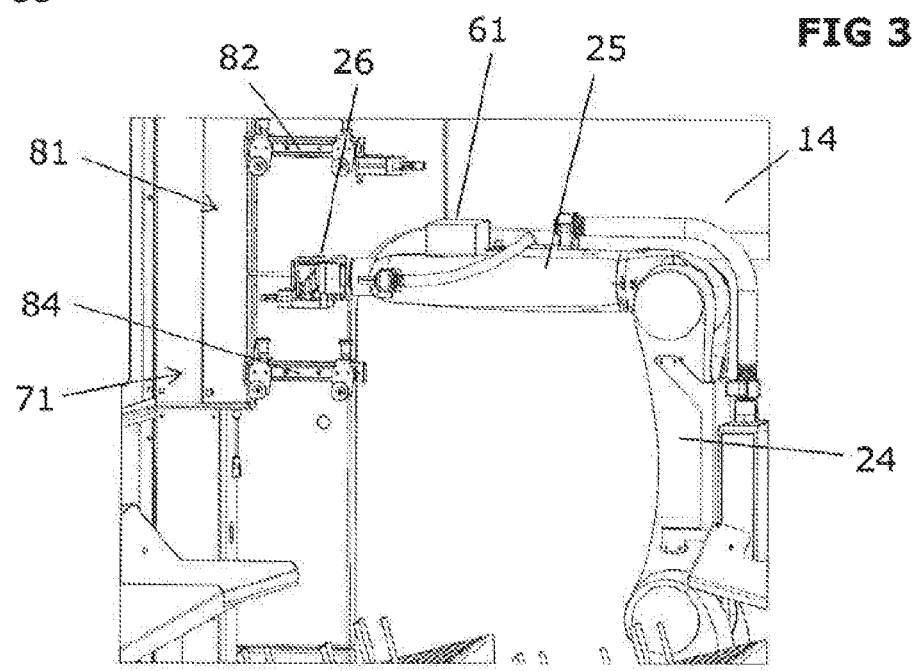
Figure 5:
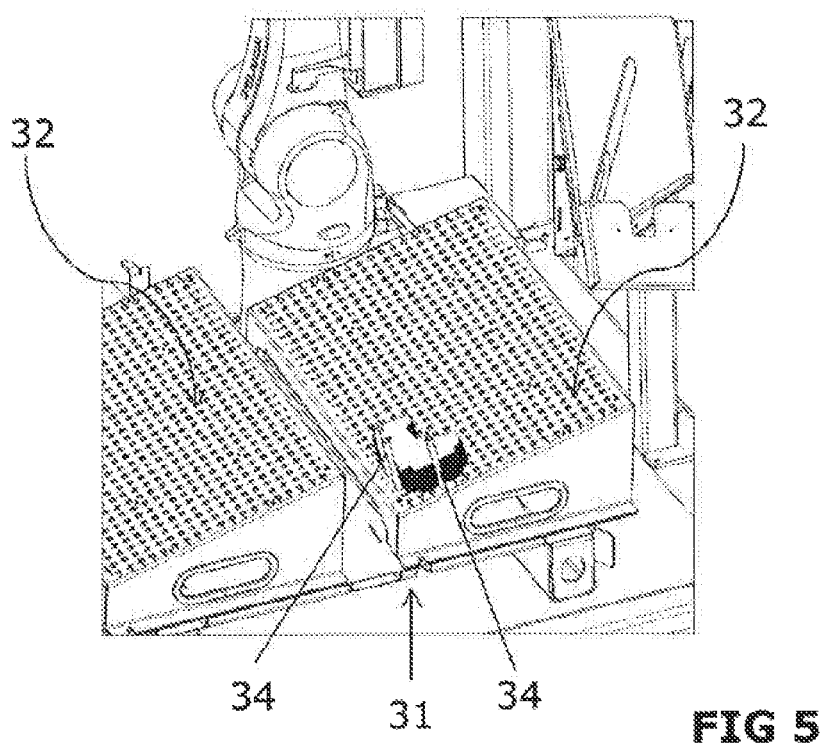
Figure 6:
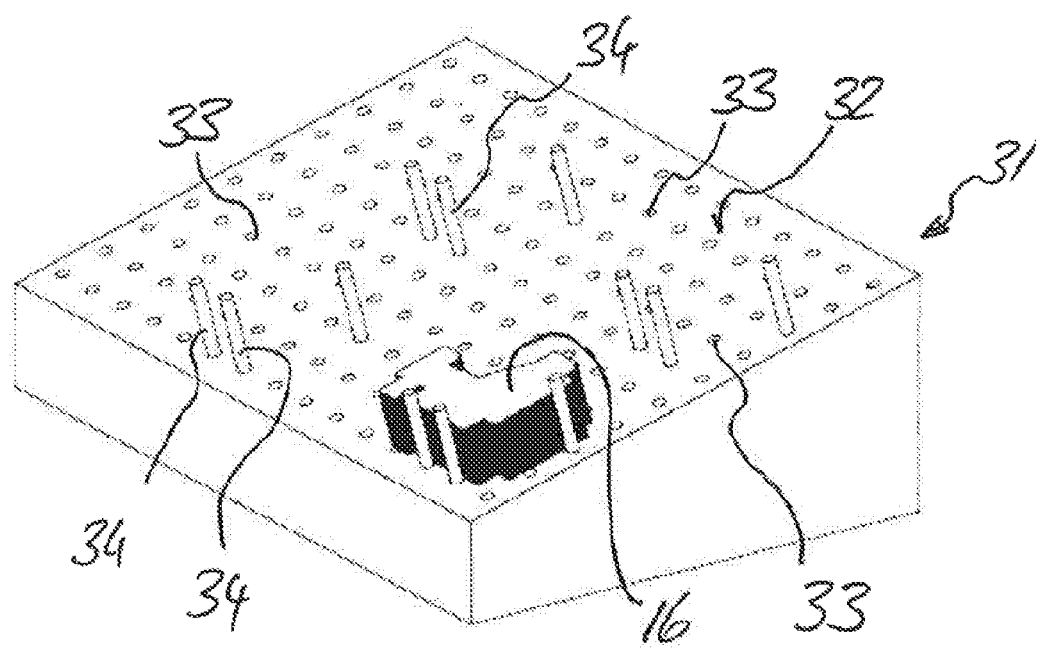
Figure 7:
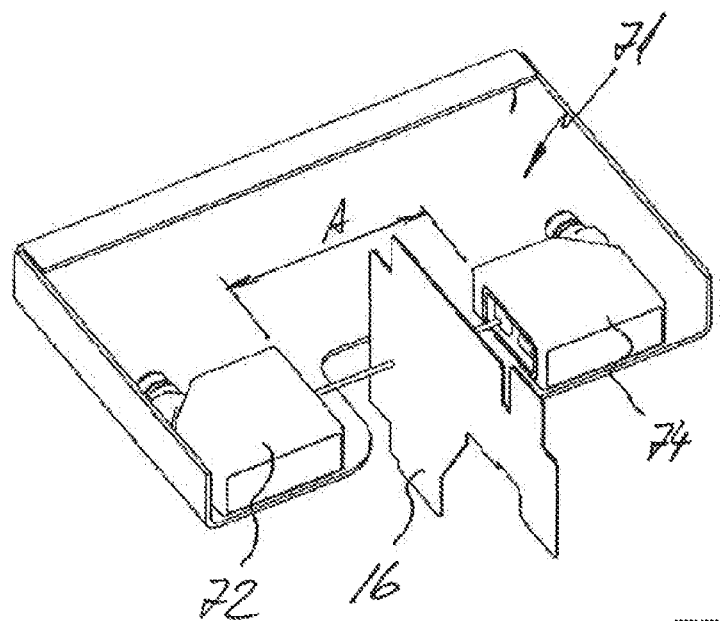
Figure 8:
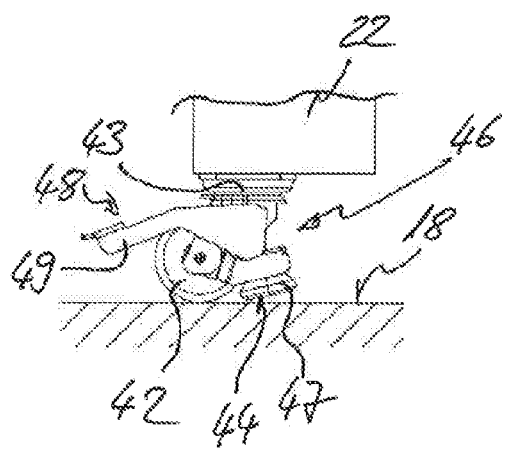
Figure 9:
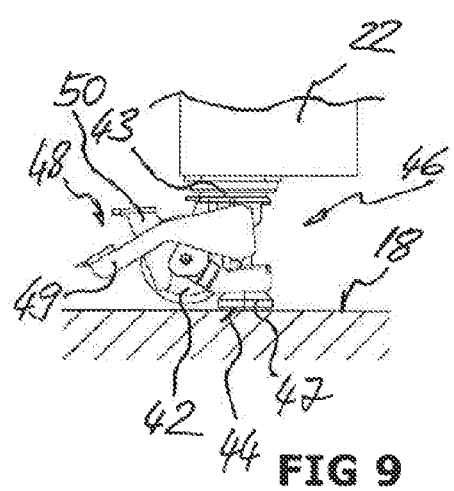

The list of reference numbers, as well as the technical content of the patent claims and figures, is part of the disclosure. The figures are described in relation to each other. The same reference numbers designate the same structural parts; reference numbers with different indices indicate similar or functionally identical structural parts:

FIG. 1 one embodiment of a production facility according to the invention with a manufacturing device and with a positionable robotic cell according to the invention in a perspective representation, FIG. 2 the production facility of FIG. 1 in a front view, FIG. 3 the production facility of FIG. 1 in a top view, FIG. 4 a perspective detail view of the robot of the robotic cell according to the invention, FIG. 5 a perspective detail view of a receiving device of the robotic cell according to the invention, FIG. 6 a perspective detail view of the receiving device of FIG. 5, FIG. 7 a perspective view of a workpiece singulation unit of the robotic cell according to the invention, FIG. 8 a side view of a positioning device of the robotic cell according to the invention in a first position, and FIG. 9 a side view of the positioning device of FIG. 8 in a second position.

The production facility 11 shown in FIGS. 1 to 4 comprises a manufacturing device, here, a bending machine 14 and a positionable robotic cell 21. The robotic cell 21 is arranged in front of the bending machine 14 and then attends the bending machine 14 automatically.

The robotic cell 21 comprises a robot 24 and a frame 22 to accommodate the robot 24. The robotic cell 21 moreover comprises a positioning device 41 for the repositioning of the robotic cell 21. The positioning device 41 here comprises four rollers 42, which are all advantageously connected rotationally to the frame 22 by a rotating device 43. As can be further seen especially from FIGS. 8 and 9, there is advantageously provided for each of these rollers 42 a supporting device 46 for the frame 22 or for the positionable robotic cell 21. The supporting device 46 comprises a bearing element 47 and an activating device 48, having a first lifting mechanism 49 for lowering the bearing element 47 and a second lifting mechanism 50 for raising the bearing element 47. Upon activating the first lifting mechanism 49, the bearing element 47 comes to bear against the base surface 18 and in addition the frame 22 is raised, so that the roller 42 is no longer in contact with the base surface 18 (see FIG. 9). By activating the second lifting mechanism 50, the bearing element 47 is again raised and the contact between the roller 42 and the base surface 18 is restored, so that the positionable robotic cell 21 can be easily repositioned (see FIG. 8).

A robot, especially a multiaxial robot 24, is provided in the frame 22 as a handling device for the handling of workpieces. Further, a receiving device 31 with two bearing surfaces 32 for the supporting of workpieces 16 and/or finished workpieces is provided in the frame 22.

The robot 24 comprises a movable robot arm 25, having at its free end a manipulating device 26, here in the form of a grip for grabbing, holding and transporting the workpieces 16 or the finished workpieces. The manipulating device 26 is advantageously secured by a manual quick-change system, with which parts-specific manipulating devices can be easily arranged as needed.

Releasably provided on the robot arm 25 is a first sensor device 61 for detecting the position of the robotic cell 21 relative to the bending machine 14. The first sensor device 61 is self-detecting and advantageously automatically self-detecting. The first sensor device 61 comprises an optical sensor, here, a laser sensor.

Alternatively or additionally, the first sensor device 61 comprises a sonic sensor, advantageously an ultrasound sensor, and/or a mechanical and/or a magnetic sensor.

Alternatively or additionally, the first sensor device 61 comprises at least one additional sensor, wherein the at least one additional sensor is an optical, preferably a laser sensor, and/or a sonic sensor, preferably an ultrasound sensor, and/or a mechanical and/or a magnetic sensor.

Advantageously, a position sensor 44 of the supporting device 46 interacts with the first sensor device 61, so that for example no machining process of the bending machine 14 will be started in one position as represented in FIG. 8. The position sensor 44 comprises for example a pressure sensor, which [in] an inactive state interrupts the machining process of the bending machine 14 and/or prevents a starting of this machining process. In this way, uncontrolled machining processes are prevented at the bending machine 14 and there are fewer workpiece rejects.

On the underside of the frame 22 there are provided two guideways as the repositioning device 23. This repositioning device 23 may be engaged, for example, by a fork of a forklift truck or pallet truck as an autonomous repositioning device, so that the robotic cell 21 can be easily repositioned. Alternatively, a belt, a rope and/or a chain for example can also be led along this repositioning device 23, and attached to a crane hook or some other hook of an autonomous repositioning device for the repositioning of the robotic cell 21.

Again alternatively, a handle may also be provided on the frame 22 for the manual repositioning by an attendant.

Advantageously, a position sensor 54 of the repositioning device 23 interacts with the first sensor device 61. Once the repositioning of the robotic cell 21 is concluded, the new position of the robotic cell 21 relative to a manufacturing device or another reference source can then be acquired by the first sensor device 61. The position sensor 54 comprises for example a pressure sensor, which [in] an active state deactivates the robotic cell 21 and especially the first sensor device 61. This precludes any uncontrolled activities of the robotic cell 21 during the repositioning.

The robotic cell 21 is connected via a connecting device 66 to the bending machine 14. The connection here is by radio. The connecting device 66 comprises a first transmitter/receiver 67 situated at the robotic cell 21 and a second transmitter/receiver 68 situated at the bending machine 14, which advantageously automatically recognize and connect to each other during or after the positioning of the robotic cell 21 at the bending machine 14.

The robotic cell 21 comprises a further sensor device 71 for the detecting of multiple workpieces 16 grasped at the same time. This further sensor device 71 comprises two sensors 72 and 74, which are placed opposite each other and at a spacing (see FIG. 7). Advantageously, the two sensors 72 and 74 are of the same kind, here, as optical sensors, namely, laser sensors. As soon as a workpiece 16 comes to lie between these two sensors 72 and 74, the distance from the respective surface to the sensor 72 or 74 is detected by both sensors 72 and 74. The difference between the spacing A minus the total of the distances determined by both of the sensors 72 and 74 yields the thickness of the workpiece 16. Since this thickness of the workpiece 16 is known, it can easily be determined when more than one workpiece 16 has been grasped.

So as not to needlessly delay the manufacturing process when more than one workpiece 16 has been grabbed at the same time, a workpiece singulation unit 81 is provided. The workpiece singulation unit 81 comprises a first holding device 82 for a workpiece 16 and a further holding device 84 for another workpiece 16. The first holding device 82 and the second holding device 84 are facing each other. Both holding devices 82 and 84 comprise a respective suction device, by which workpieces 16 which are sticking together can be easily separated from each other. Alternatively or additionally to a suction device, one or both holding devices 82 and 84 may also comprise a clamping device.

Further, a grasping device 76 is provided for grabbing a workpiece 16 or a finished workpiece. The grasping device 76 here comprises two gripping sections 77, which grab the workpiece 16 or the finished workpiece as needed, so that the robot 24 can again grab it in a different orientation. The grasping device 76 may also serve as a temporary storage for a workpiece 16 or a finished workpiece in a process chain. The grasping device 76 also interacts advantageously with a further or one of the mentioned sensor devices.

The receiving device 31 shown in detail in FIGS. 5 and 6 has two bearing surfaces 32. Each bearing surface 32 is provided with multiple holes 33, arranged in a grid. Further, the receiving device 31 comprises multiple guide elements 34, which can be arranged interchangeably on the bearing surfaces 32. The guide elements 34 are arranged such that a workpiece 16 or a stack of workpieces lies in a desired orientation on the bearing surface. The receiving device 31 is outfitted with the corresponding workpieces—for example, according to a previously defined bending plan—while even workpieces of different shapes can also be so arranged. The arrangement of multiple stacks of workpieces on a receiving device 31 is also conceivable.

The position of the guide elements 34 can be detected by the sensor device

61, for example by means of a position sensor, e.g., by means of a distance sensor. The robot 24 will be controlled on the basis of the values so acquired, such that the corresponding workpiece 16 can be grabbed by it for the intended bending process.

The robotic cell 21 is positioned at the bending machine 14 and secured by means of the supporting devices 46. The first sensor device 61 was previously arranged on the robot arm 25 or is now so arranged. By means of the first sensor device 61, the position of the robotic cell 21 relative to the bending machine 14 is acquired. The control system of the robot 24 is now adapted to the acquired position of the robotic cell 21.

If the position of the robotic cell 21 happens to be such that the robot 24 cannot reach all the points or positions to be serviced for the intended manufacturing process, the robotic cell 21 will be repositioned and then this repositioned position of the cell will be acquired once again. Advantageously, the robotic cell 21 has its own drive device, so that it can be repositioned—especially advantageously in autonomous manner.

Through the communication link between the robotic cell 21 and the bending machine 14, the latter is controlled by the robotic cell 21. The attending of the robotic cell 21 in this case is done by an operator unit 15 of the bending machine 14, which is designed as a touchscreen. Thus, the positionable robotic cell 21 does not need to have its own operator unit.

For the fabricating of a bent part, the robot 24 grabs a workpiece 16 from the receiving device 31. The robot 24 takes the workpiece 16 to the further sensor device 71 in order to ascertain whether multiple workpieces 16 have been grabbed at the same time. If such is the case, the multiple workpieces 16 are separated from each other by the workpiece singulation unit 81.

The robot 24 now takes the single workpiece 16 to the bending machine 14 and positions it according to the bending plan, possibly by means of the back stops of the bending machine. The bending process is now started. The workpiece 16 may be held by the robot 24 during the entire bending process.

After completion of the bending process, the bent workpiece is held by the robot 24 and taken to a receiving bin 38 for example via a chute 36.

Alternatively, the robot 24 may also place the finished bent workpiece directly in the receiving bin 38.

If the bending plan involves further bending processes and the workpiece cannot be fed directly by the robot 24 to the bending machine 14—e.g., on account of bending steps already performed—the robot 24 hands off this workpiece to the grasping device 76 and again detects the workpiece, but in an orientation advantageous to the further machining step.

The robotic cell 21 has safety doors 39 at the side facing the bending machine 14 in the state when so positioned and/or at the sides adjacent to this side. These safety doors 39 are positioned such in relation to the bending machine 14 that the work zone of the robot 24 is not directly accessible. Furthermore, the corresponding side of the robotic cell 21 can be closed off, which is especially advantageous during the repositioning of the robotic cell 21. At least a portion of the safety doors 39 is transparent, so that the work zone can be observed from the outside. Advantageously, the robotic cell 21 has safety doors all around it.

The positionable robotic cell 21 forms a mobile robotic bending unit and can be arranged at a manufacturing device with few positioning steps. With the positionable robotic cell 21, the area of application can be expanded even for smaller manufacturing devices, since now series manufactured parts can also be fabricated on these manufacturing devices automatically or without an attendant, even in a work shift operation. In this way, on the one hand, the useful life of the bending machine is increased and the production costs are reduced, especially for series manufactured parts.

Particular benefits of the invention, though not the only ones, are:

The robotic cell 21 does not need to be positioned exactly in front of the bending machine 14, but only approximately so. By means of the first sensor device 61, the precise position of the robotic cell 21 relative to the bending machine 14 is ascertained.

The interface with the bending machine 14 is wireless or wire-line, e.g., across two Ethernet cables, one of them serving for the data transmission and the other one for the transmission of safety signals.

A safety control unit of the manufacturing device, such as a foot pedal of a bending machine, can be connected directly to the robotic cell, making possible an operation of the manufacturing device with higher speeds than in a manual operation.

The programming of the manufacturing device and also the positionable robotic cell can be done entirely offline. When linking them together, they are coordinated with each other and the production is started—not later than after the setup (tools, robot grips, circuit boards, pallets). After a calibration period of a few minutes, an automatic fabrication is possible.

The invention claimed is:

1. A positionable robotic cell for placement at a manufacturing device having a connecting device, the robotic cell comprising:
   a connecting device connected to the manufacturing device via the manufacturing device connecting device,
   a frame having a mount receiving a robot; and
   at least one receiving device for receiving at least one workpiece from the manufacturing device; and
   a positioning device for repositioning the robotic cell relative to the manufacturing device,
   wherein the positioning device comprises at least a first sensor device automatically detecting a first sensor position relative to the manufacturing device during positioning of the robotic cell relative to the manufacturing device and
   during repositioning of the robotic cell relative to the manufacturing device, the positioning device automatically detecting the position of the robotic cell relative to the manufacturing device based on at least the automatically detected first sensor position.

2. The robotic cell as claimed in claim 1, wherein at least the first sensor device is self-detecting and automatically self-detecting.

3. The robotic cell as claimed in claim 1, wherein a repositioning device is provided for the repositioning of the robotic cell with an autonomous repositioning device, which interacts with the at least one first sensor device.

4. The robotic cell as claimed in claim 1, wherein the at least one receiving device comprises at least one guide element which can be arranged interchangeably on a bearing surface of the receiving device and the position of the at least one guide element can be detected by at least the first sensor device.

5. The robotic cell as claimed claim 1, wherein the robotic cell comprises at least one connecting device for connecting the robotic cell to the manufacturing device.

6. The robotic cell as claimed in claim 1, wherein at least one additional sensor device is provided for detecting multiple simultaneously grasped workpieces.

7. The robotic cell as claimed in claim 1, wherein at least one workpiece singulation unit is provided, wherein the at least one workpiece singulation unit comprises at least one first holding device for a workpiece and at least one second holding device for a further workpiece, and the at least one first holding device and the at least one second holding device are facing each other.

8. The robotic cell as claimed in claim 1, wherein a grasping device is provided for grasping a workpiece or a machined workpiece, and the grasping device interacts with at least the first sensor device.

9. A production facility with a manufacturing device that comprises one of a sheet metal machining device, a bending machine or a press brake, and with the positionable robotic cell as claimed in claim 1.

10. The robotic cell as claimed in claim 1, wherein at least the first sensor device comprises at least one first sensor, wherein the at least one first sensor is an optical sensor, and/or a sonic sensor, and/or a mechanical sensor and/or a magnetic sensor.

11. The robotic cell as claimed in claim 10, wherein the optical sensor comprises a laser sensor and/or the sonic sensor comprises an ultrasonic sensor.

12. The robotic cell as claimed in claim 10, wherein at least the first sensor device comprises at least one additional sensor, wherein the at least one additional sensor is an optical sensor, and/or a sonic sensor, and/or a mechanical sensor and/or a magnetic sensor.

13. The robotic cell as claimed in claim 12, wherein the optical sensor comprises a laser sensor and/or the sonic sensor comprises an ultrasonic sensor.

14. The robotic cell as claimed in claim 1, wherein at least one handling device is provided for the handling of workpieces, comprising at least one robot, and wherein the first sensor device, is provided at the at least one handling device.

15. The robotic cell as claimed in claim 14, wherein the at least one robot comprises a multiaxial robot.

16. A method for operating the positionable robotic cell as claimed in claim 1 at a manufacturing device, the method comprising:
 a) positioning of the robotic cell at the manufacturing device; and
 b) detecting a position of the robotic cell relative to the manufacturing device by means of at least the first sensor device.

17. The method as claimed in claim 16, wherein after detecting a first position of the robotic cell, the robotic cell is repositioned in at least one further position.

18. The method as claimed in claim 16, wherein the robotic cell is in communication with the manufacturing device and is controlled by a control device of the manufacturing device, or by an operator unit of the manufacturing device.

* * * * *